Jan. 5, 1943.  I. L. YOUNG  2,307,181
CASING CLOSURE
Filed Nov. 15, 1939
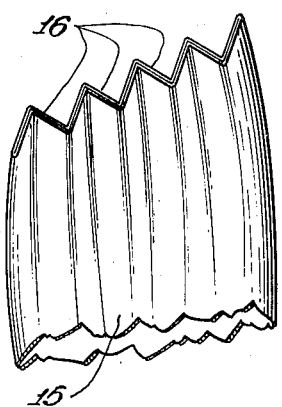
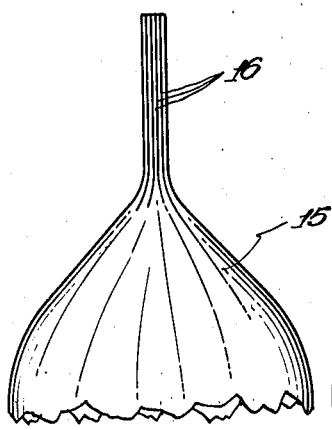
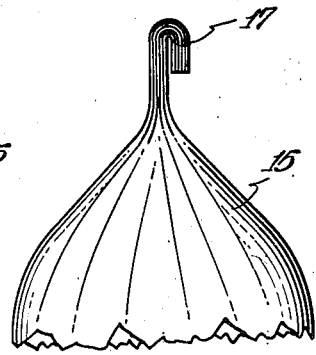
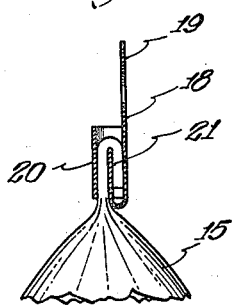
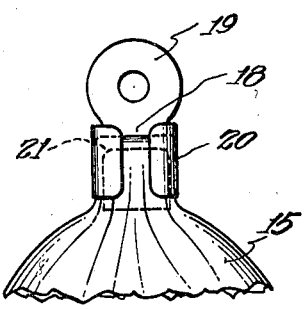
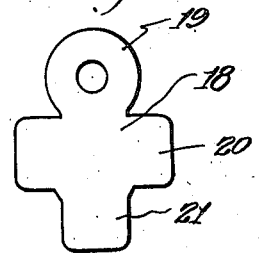
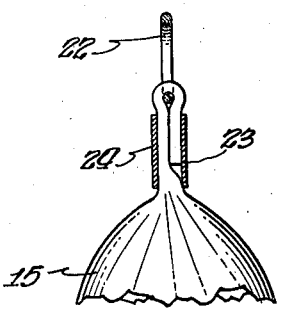
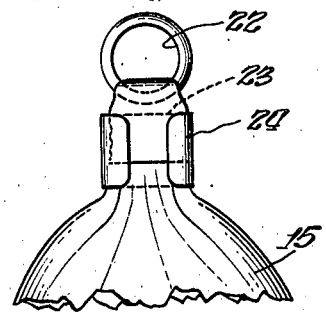
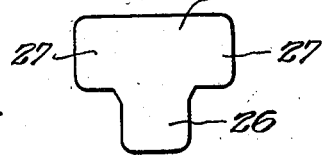
Inventor:
Irvin L. Young
By: Stevens & Batchelor
Atty's Patented Jan. 5, 1943

2,307,181

UNITED STATES PATENT OFFICE 2,307,181

CASING CLOSURE

Irvin L. Young, Chicago, Ill.

Application November 15, 1939, Serial No. 304,627

1 Claim. (Cl. 229—65)

My invention relates to flexible casings in which foods or other products are packed or dispensed. Casings of this character are usually made in tubular form and require tight closures in order to withstand the packing of foods under pressure or to prevent leakage from foods which have or develop a liquid content. Thus, casings of the type contemplated may be formed from animal matter, or even cloth or paper; however, artificial casings of wet or dry cellulose are largely used for sausages, meat loaf and other stuffed or packed products.

Without dwelling on the primitive or makeshift methods for closing casings of the type considered, it may be said that a common method for effecting a closure is to gather each end of the casing into the form of a solid stem, bend the latter over and tie it tightly around. In some cases, the gather is by means of a series of accordion folds made from the flattened casing, the group of folds assuming the form of the solid stem. While this form of closure may be considered as satisfactory, it still has the ear-marks of a manual attempt or device to secure the desirable result.

It is one object of my invention to incorporate a mechanical clamping factor in the gathered closure of the casing which will assure the tightness of the same permanently. A further object is to provide a clip which is neat, compact and sanitary. Another object is to design the clip as a hanger to form a suspension means for the casing. An additional object is to construct the hanger in a single piece for utmost economy in manufacture and ease in handling.

With the above objects in view, and any others which may suggest themselves from the description to follow, a better understanding of the invention may be had by reference to the accompanying drawing, in which—

Fig. 1 is a perspective view of one end of a tubular casing as initially formed to make the closure;

Figs. 2 and 3 are edge views of such a casing portion as it appears when filled with a sausage or other meat content and illustrating further steps in the formation of the closure;

Fig. 4 is a view similar to Fig. 3 showing a cross section of the hanger as applied;

Fig. 5 is a front view of the showing in Fig. 4;

Fig. 6 is a plan view of the blank from which the novel hanger is formed;

Fig. 7 is a view similar to Fig. 4, showing a modification of the hanger as applied and employing a suspension ring;

Fig. 8 is a front view of the showing in Fig. 7;

Fig. 9 is a plan view of the blank from which the hanger of Figs. 7 and 8 is formed; and Fig. 10 is a view similar to Fig. 9 showing a further modification of the hanger.

In accordance with the foregoing, specific reference to the drawing indicates the body of the tubular casing at 15. Fig. 1 illustrates the method of flattening the casing and imparting a series of accordion folds 16 to the same. The solid stem formed by gathering the accordion folds is shown in Fig. 2. The formation of the stem with a hook or return bend 17 is shown in Fig. 3.

The securing portion of the hanger is a sturdy plate 18 of metal which is plated or otherwise covered with a non-corrosive coating. The upper portion of the plate is extended with an eye 19, the side portions with wings 20, and the bottom portion with a tongue 21.

The eye 19 of the plate 18 is provided to facilitate the suspension of the hanger from a hook or nail, while the tongue 21 is turned up in front as indicated in Fig. 4 to form a hook-like receptacle. The gathered upper end 16 of the sausage casing is applied to the hanger by depositing its down-bend 17 in the receptacle 21 as shown. The side wings 20 of the plate are then bent forward and pressed upon the gathered portion of the casing as indicated in Figs. 4 and 5 in order to hold the same firmly. At the same time the eye 19 forms a suspension means for the filled casing when the same is to be hung up.

In the modification of Figs. 7 and 8 the down-bend 17 of the gathered casing portion receives a suspension ring 22, in which event the simple plate 23 of Fig. 9 is adapted to form the clamp of the hanger. Thus, the end portions 24 of this plate may be bent forward and pressed upon the doubled sections of the gathered casing portion to clamp the same firmly together and complete the connection for the suspension ring 22.

The modification of Fig. 10 is intended for use when the ring 22 is employed as just described. Thus, the plate 25 is applied with a bottom tongue 26 to the sausage casing as formed per Fig. 3 in the same manner as shown in Fig. 4. However, the ring 22 is inserted in the bend of the gathered portion before the plate 25 is applied. Finally, the side portions 27, are adjusted in the manner previously described to complete the fastening.

It will be evident from the above description that the novel hanger in any of its forms, by being pressed upon the gathered casing end, forms a permanent and rigid lock or clamp to assure the retention of the casing closure as well as the suspension of the filled casing irrespective of its weight. Further, the novel hanger permits an assortment of encased foods, such as sausages, meat loaf, etc., to be independently hung for the smoking process and thus remain separated from each other in contrast with such foods as are usually strung along a bar by the old fashioned means, where some of them would touch from the closeness of the strings or the sagging of the bar, preventing the access of the smoke to the intimate areas thereof. Further, the hanger as a suspension means replacing the usual greasy or slimy string is of a nature to be easily cleaned and brightened after the smoking is finished, so as to present a neat and sanitary appearance and be as clean to handle as the casing in which the food is contained. Obviously, the hanger will be formed with the eye 19 or ring 22 for application to that end of the casing which is to be suspended, while the clip of Fig. 9 or Fig. 10 could be applied to the opposite end purely to form a permanent closure at such end. Further, it will be evident that the casing closure and the securing hanger therefor are of a nature to be formed and made fast by relatively simple hand tools or machines. Finally, the casing formation and hanger are in themselves of utmost simplicity, whereby to make their production very inexpensive.

While I have described the main and modified forms of the invention along specific lines, various minor changes and refinements may be made without departing from their principle, and I desire to consider all such changes as coming within the scope and spirit of the appended claim.

I claim:

A hanger for a hook forming the upper end of a container comprising a suspension plate applied to the front of the hook, a bottom rearward extension of the plate rising into the fold of the hook, side wings from the plate extended rearwardly and clamped over the back of the hook, and an upward extension of the plate expanded to form a substantially-circular headpiece and perforated in the center to serve as an eye.

IRVIN L. YOUNG.